(12) United States Patent
Mathis et al.

(10) Patent No.: US 7,625,848 B2
(45) Date of Patent: *Dec. 1, 2009

(54) ANTI-TRACTION COMPOSITIONS

(75) Inventors: Ronald J. Mathis, San Antonio, TX (US); Mary C. Marshall, San Antonio, TX (US); Nicholle K. Reinhardt, San Antonio, TX (US); Errol M. Brigance, San Antonio, TX (US); Geronimo I. Elias, Lytle, TX (US); Dennis S. Rushforth, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 568 days.

This patent is subject to a terminal disclaimer.

(21) Appl. No.: 11/470,117

(22) Filed: Sep. 5, 2006

(65) Prior Publication Data
US 2007/0173422 A1 Jul. 26, 2007

Related U.S. Application Data

(63) Continuation-in-part of application No. 10/727,615, filed on Dec. 5, 2003, now Pat. No. 7,405,184, and a continuation-in-part of application No. 10/315,208, filed on Dec. 10, 2002, now Pat. No. 7,067,464.

(60) Provisional application No. 60/338,654, filed on Dec. 11, 2001.

(51) Int. Cl.
*C10M 173/00* (2006.01)
*C10M 149/06* (2006.01)

(52) U.S. Cl. .................. 508/471; 508/507; 508/551; 508/583; 106/36; 106/287.25

(58) Field of Classification Search ................ 524/475, 524/547, 577, 521; 508/179, 175, 472, 471, 508/469, 507; 137/807; 442/181; 428/158, 428/403; 522/14; 523/129; 528/502 R; 102/2, 36, 287.25; 507/222
See application file for complete search history.

(56) References Cited

U.S. PATENT DOCUMENTS 3,562,193 A * 2/1971 Leeks et al. ................. 524/519

(Continued)

FOREIGN PATENT DOCUMENTS

DE     1644976     10/1971

(Continued)

OTHER PUBLICATIONS

International Search Report dated Nov. 12, 2004 issued in related International Patent Application No. PCT/US03/39227.

(Continued)

*Primary Examiner*—Ellen M McAvoy
*Assistant Examiner*—Chantel Graham
(74) *Attorney, Agent, or Firm*—Grossman, Tucker et al.

(57) ABSTRACT

An anti-traction material is disclosed which may be used as a coating on a variety of surfaces over which people and vehicles may find it difficult to traverse. The anti-traction material may include polymer particles capable of absorbing or being dissolved by a fluid and a fluid capable of absorbing or dissolving the polymer particles. The anti-traction material may include hydrophobic particles which may then control the rate and/or amount of fluid absorption of the polymer particles which may therefore improve storage capability and polymer particle flow behavior.

25 Claims, 1 Drawing Sheet

U.S. PATENT DOCUMENTS

| | | | |
|---|---|---|---|
| 3,928,215 A * | 12/1975 | Dreher et al. | 508/175 |
| 3,983,213 A | 9/1976 | Lissant | |
| 4,069,186 A | 1/1978 | Ramig | |
| 4,221,229 A * | 9/1980 | Dreher et al. | 137/13 |
| 4,450,197 A | 5/1984 | Hager | |
| 4,493,777 A | 1/1985 | Snyder, Jr. et al. | |
| 4,541,947 A | 9/1985 | Clark et al. | |
| 4,606,489 A | 8/1986 | Steinhart et al. | |
| 4,606,834 A | 8/1986 | Hart et al. | |
| 4,606,913 A | 8/1986 | Aronson et al. | |
| 4,650,596 A | 3/1987 | Schlueter et al. | |
| 4,664,823 A | 5/1987 | Kuwamoto et al. | |
| 4,673,516 A | 6/1987 | Berry | |
| 4,781,847 A | 11/1988 | Weitz | |
| 5,114,849 A | 5/1992 | Ben-Bassat et al. | |
| 5,171,781 A | 12/1992 | Farrar et al. | |
| 5,190,679 A | 3/1993 | McDonald | |
| 5,209,860 A | 5/1993 | Trivett | |
| 5,258,424 A | 11/1993 | Yagi et al. | |
| 5,338,129 A | 8/1994 | Oden | |
| 5,384,343 A | 1/1995 | Farrar et al. | |
| 5,470,498 A | 11/1995 | Pialet et al. | |
| 5,534,169 A * | 7/1996 | Vinci | 508/460 |
| 5,639,796 A | 6/1997 | Lee | |
| 5,834,553 A | 11/1998 | Roberts et al. | |
| 5,863,875 A | 1/1999 | Steckel | |
| 5,962,578 A | 10/1999 | Beihoffer et al. | |
| 6,031,041 A | 2/2000 | Chung et al. | |
| 6,034,041 A | 3/2000 | Nittel | |
| 6,149,970 A | 11/2000 | Frigge et al. | |
| 6,197,382 B1 | 3/2001 | Ornstein et al. | |
| 6,242,489 B1 | 6/2001 | Pinney | |
| 6,271,184 B1 | 8/2001 | Seebauer et al. | |
| 6,642,351 B1 | 11/2003 | Harlukowicz et al. | |
| 6,689,200 B2 | 2/2004 | Scarborough et al. | |
| 6,784,141 B1 | 8/2004 | King et al. | |
| 7,067,464 B2 | 6/2006 | Mallow et al. | |
| 7,405,184 B2 * | 7/2008 | Mathis et al. | 508/471 |
| 7,419,942 B2 * | 9/2008 | Mallow et al. | 508/471 |
| 2003/0207634 A1 * | 11/2003 | Holeschovsky | 442/221 |
| 2004/0059043 A1 | 3/2004 | Mallow et al. | |
| 2004/0151909 A1 | 8/2004 | Mathis et al. | |
| 2005/0164580 A1 * | 7/2005 | Holeschovsky | 442/221 |

FOREIGN PATENT DOCUMENTS

| | | |
|---|---|---|
| DE | 2554082 | 6/1977 |
| EP | 0041834 | 12/1981 |
| EP | 0341577 | 11/1989 |
| EP | 1160299 | 12/2001 |
| FR | 2753986 | 4/1998 |
| GB | 1312083 | 4/1973 |
| GB | 1562417 | 3/1980 |
| JP | 02042351 | 2/1990 |
| JP | 06293875 | 10/1994 |
| WO | 9115434 | 10/1991 |
| WO | 9207924 | 5/1992 |
| WO | 9851731 | 11/1998 |
| WO | 03050192 | 6/2003 |

OTHER PUBLICATIONS

International Search Report dated Apr. 11, 2003 issued in related International Patent Application No. PCT/US02/39452.

European Office Action dated Jun. 14, 2007 issued in related European Patent Application No. 03810062.4-2104.

International Preliminary Examination Report dated Mar. 5, 2004 issued in related International Patent Application No. PCT/USUS02/39452.

Cytech Industries Inc., "Superfloc Dry Polyacrylamide (PAM), anionic: A-100 Series," Aug. 8, 2003.

* cited by examiner

ANTI-TRACTION COMPOSITIONS

CROSS-REFERENCE TO RELATED APPLICATIONS

This application claims priority as a continuation-in-part of U.S. patent application Ser. No. 10/727,615 filed on Dec. 5, 2003, which claims priority as a continuation-in-part of U.S. patent application Ser. No. 10/315,208 filed on Dec. 10, 2002, now U.S. Pat. No. 7,067,464, which claims the benefit of U.S. Provisional Application Ser. No. 60/338,654, filed Dec. 11, 2001. The content of each of the above identified applications is incorporated herein by reference in its entirety.

This invention was made with government support under Contract No. V674P-2995; Delivery Order No. 674-W10091, and Contract No. M67854-02-D-1087; Delivery Order No. 0001, awarded by the United States Marine Corps. The government has certain rights in the invention.

FIELD OF THE INVENTION

The present invention relates to anti-traction compositions including polymer material having enhanced storage and flow properties including associated methods of preparation.

BACKGROUND OF THE INVENTION

Non-lethal weapon systems may provide an alternative for law enforcement officials and strategic defense purposes. Non-lethal weapons may be available along a force continuum, such that a non-lethal weapon may be selected for a particular application based on the nature of the threat and level of provocation. Typical non-lethal weapons may include barriers, tear gas, flash grenades, acoustic guns, sticky foams, snare nets, stun guns, strobe lights, malodorants, etc. Such non-lethal weapons, however, may also have disadvantages. For example, they may be bulky, require advance planning to move into place, require large storage areas when not in use, or may be destroyed or used as weapons by crowd and riot participants. They may also be besieged by motor vehicles driven by crowd and riot participants. Further, some non-lethal weapons, such as tear gas, may still invoke physical and/or psychological injury and may fail to impede forward progress of determined crowd and riot participants.

SUMMARY OF THE INVENTION

The present disclosure relates to an anti-traction material which may include polymer particles capable of absorbing or being dissolved by a fluid having an average particle size in the range of about 0.01-2.50 mm. Such fluid may be present at a ratio of about 1-40 parts by weight to one part by weight of the polymer particles wherein the polymer particles and fluid may combine to form an anti-traction material. The anti-traction material may include hydrophobic particles wherein the hydrophobic particles may be present in the composition at about 0.01-10% by weight. The hydrophobic particles may then control the rate and/or amount of fluid absorption of the polymer particles.

In method form, the present disclosure relates to a method for forming an anti-traction coating on a selected surface. The method may include mixing polymer particles having an average particle size in the range of about 0.01-2.50 mm with fluid wherein said particles are capable of being absorbed or dissolved by the fluid. The fluid may again be present at a ratio of about 1-40 parts by weight to one part by weight of the polymer particles. The anti-traction coating may have a thickness of greater than or equal to about 0.001 inches (0.127 mm).

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION OF THE INVENTION

Figure 1:
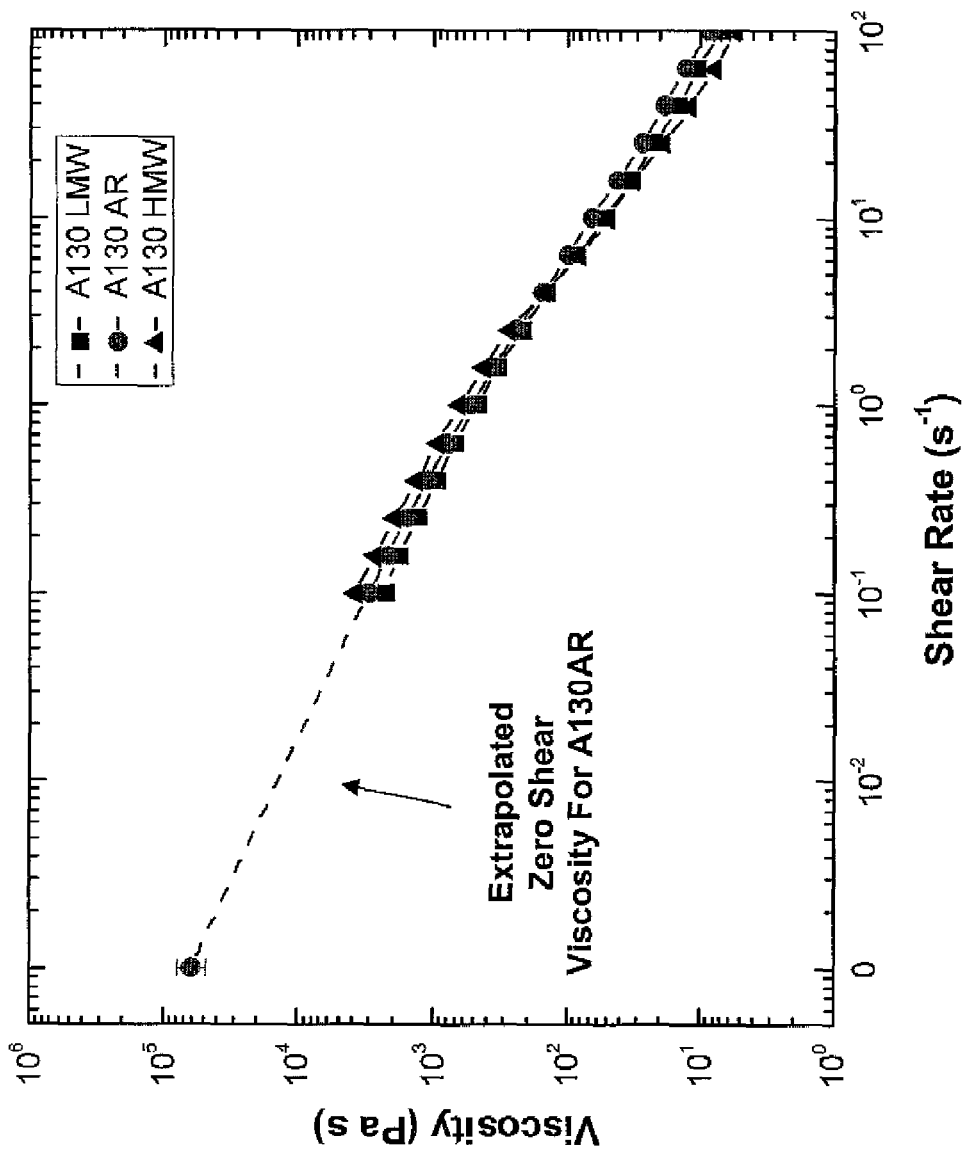
FIG. 1 provides plot of viscosity in pascal-seconds (Pa-s) versus shear rate for a polyacrylamide type anti-traction material in fluid at a ratio of about 10 parts fluid to 1 part polymer at different relative molecular weights values.

The present invention relates to anti-traction compositions including polymeric material which may also provide enhanced storage and flow properties. The polymer material may be in any physical form, such as particle form, and may then be capable of interaction with a fluid. The fluid may swell the polymer which may then increase the diameter as well as the mean particle size (i.e. average diameter of a plurality of polymer particles) to provide an anti-traction material. The fluid may also dissolve all or a portion of the polymer. As used herein, anti-traction material may be understood as a material capable of application to a surface to form a coating over which people and vehicles may find it difficult or impossible to traverse.

Initially, the polymer particles may be present with a size, porosity and/or surface area which provides that for a given time interval the fluid may be substantially absorbed by the polymer and diffuse substantially throughout the polymer material's average cross-sectional thickness. In addition, as noted above, it is also contemplated that the polymer particles may dissolve in the fluid wherein the fluid and dissolved polymer may significantly increase in viscosity, depending upon the relative concentration between polymer and fluid. Accordingly, the anti-traction material coating that may be formed herein may rely upon a combination of swollen polymer particles and dissolved polymer particles. The anti-traction material may also be characterized as a viscoelastic type material, wherein it is capable of both a viscous response and/or elastic response to an applied stress.

Expanding on the above, a viscous material may not return a portion of the energy stored during loading whereas an elastic material may return a major portion of the energy stored during loading. A viscoelastic material may therefore return some of the energy stored during loading when the load is removed, via primarily elastic recovery, with only a small amount due to viscous recovery. Thus, the anti-traction material may be capable of substantially resuming its original shape after being displaced by a load. This may therefore provide for an anti-traction coating that resists vertical slump, displacement by gravitational forces, and displacement by forces of foot and vehicle traffic.

For certain applications a time interval may be contemplated for the absorption or dissolution of polymer. Specifically, anti-traction performance may be achieved in less than or equal to about 60 seconds, including all values and increments between about 0.1-60 seconds. Accordingly, the polymer may absorb a portion of the fluid or the polymer may be dissolved by the fluid to provide anti-traction performance within a time of less than or equal to about 30 seconds, or even less than or equal to about 10 seconds, or less than or equal to 5 seconds, etc. It may therefore be appreciated that with respect to a polymer particle, a portion of fluid may be absorbed by or dissolved by a portion of the particles within less than or equal to about 60 seconds. It can also be appreciated that the advantage of such a response may allow for anti-traction performance to be developed over a relatively short time period for any given application.

Under certain conditions the fluid may not locally concentrate at, e.g., the surface of the particle without reaching the particle core. When locally concentrating at or within a given surface layer thickness it may be appreciated that the particles may then only provide an outer and relatively swollen region and a relatively dry and non-swollen core. This may then reduce the capability of the particles to provide optimum anti-traction performance, but sufficient anti-traction performance may nonetheless be achieved.

The polymers herein may assume an average particle size in the range of about 0.01 to 2.50 mm, including all values and increments therein. Average particle size may therefore be understood as the average of the largest linear dimension of a plurality of particles. In addition, while such particles may assume a geometry that is generally round or spherical, it should be noted that the particles may also be milled to such average particle dimension and assume a variety of geometries associated with a milling or physical grinding procedure. For example, the particle may be irregular in size and may also have relatively irregular outer geometries due to mechanical shearing. In one example, particles were provided that were generally round and initially had an average particle diameter of about 1.00 mm and such particles were milled to an average particle diameter of about 0.30-0.50 mm.

The polymer composition herein may indicate a fluid absorption capacity of at least about 15% by weight (wt.). That is, the weight of the fluid absorbed or retained at saturation may be about 15% by weight of the composition employed. More preferably, it is contemplated that the polymer particles may indicate an absorption capacity as high as about 10,000% (wt.), or within the range of about 15-10,000% by weight, including all values and increments therein. Accordingly, the polymer particles herein may absorb up to 100 times their weight in fluid.

Upon absorption of fluid, the polymer material may therefore increase in viscosity ($\eta$) and provide a gel substance. With attention to FIG. 1, a rheology analysis is provided for a polyacrylamide based anti-traction material at relatively low (A130LMW), medium (A130AR) and relatively high molecular weight (A130HMW) sample. The analysis was performed on a 40 mm parallel plate viscometer at a temperature of about 20° C. As can be seen, a gel may be formed herein having an extrapolated zero shear viscosity ($\eta_0$) viscosity of between about $10^4$-$10^5$ poise for a system that combines about 1 part polymer with about 10 parts fluid. Accordingly, it can be recognized that the value of viscosity may be dependent upon the relative concentration of fluid to polymer as well as polymer molecular weight. In addition, it may be appreciated that when applied to a given surface, and combined with fluid, the anti-traction material may not illustrate uniform viscosity across a given surface, as the rate of fluid absorption may vary. In addition, it has been observed that the viscosity of the anti-tracking material here may be non-Newtonian, as the observed viscosity will be dependent upon the applied shear rate as is apparent from FIG. 1. Accordingly, the value of $\eta$ may vary and drop in value with increasing shear rate. However, anti-traction performance may still be achieved herein with such a non-Newtonian polymer/fluid combination. Or, stated another way, the compositions herein, as illustrated by the performance of A130AR, provide anti-tracking performance although demonstrating non-Newtonian viscosity behavior between shear rates of about 0-$10^2$ (sec$^{-1}$).

In addition, and as noted, it is contemplated that the polymer herein may be provided in particle form with a selected porosity and/or surface area which may also provide relatively efficient uptake of a given fluid suitable for anti-traction performance. For example, it is contemplated herein that the particles may be porous and provide an average pore size of greater than about 50 microns ($\mu$m) and may fall in the range of between 50-500 $\mu$m, including all values and increments therein. With respect to surface area (SA), it is contemplated herein that the particles may have an average surface area that is greater than or equal to about 0.003 square millimeters (mm$^2$). For example, for particles which are generally round and have an average particle diameter of about 0.50 mm, the average surface area may be equal to or greater than about 0.79 mm$^2$. It may be appreciated that for round particles the surface area may be calculated by the relationship: SA=$4\pi$ (radius)$^2$.

As noted, the particles herein may be understood as any polymeric resin that is capable of absorbing or being dissolved by a fluid. Such particles may therefore include polymeric resins that may be understood as hydrophilic. Reference to hydrophilic may be understood as those polymers that are capable of absorbing fluids such as water or even alcohols (ROH) where R may be an aliphatic or aromatic moiety. This may therefore include those polymers that are capable of dipole-dipole interaction such as hydrogen bonding wherein a polar site on one polymer chain that is relatively negative may associate with a relatively positive site from the hydrogen atom associated with a water molecule or other fluid molecule containing similar capability. However, it may again be appreciated that the present invention contemplates the absorption and swelling and formation of an anti-traction material that may be triggered by any fluid molecule.

Furthermore, the fluids herein may therefore be understood as those compounds that have a molecular weight (MW) of less than or equal to about 1000 and which may therefore be capable of flow at room temperature (approximately 25° C.). Accordingly, while water may be preferred, the fluids herein may even include aqueous solutions (e.g., water with a dissolved solute), alcohols, polyhydric alcohols such as glycerol or those even those organic solvents that may be otherwise miscible with water.

In addition the fluid herein may include a first swelling or dissolving fluid combined with a second fluid that is not necessarily miscible with such first fluid and which may have a specific gravity (Sp.G) that is different from the first fluid. Accordingly, the specific gravity of the second fluid may be less than the specific gravity of the first fluid. The second fluid may therefore have a MW and corresponding vapor pressure that controls evaporation of the underlying first fluid. For example, one may select any fluid which may otherwise not provide swelling or dissolving of the polymer, but which may have a specific gravity of less than 1.0. In the exemplary embodiment in which water is the swelling or dissolving fluid, the non-swelling fluid may then tend to float to the top of the swollen polymer/water mixture and may then reduce the evaporation rate of the water that is relied upon to trigger swelling and anti-traction performance. Accordingly, various hydrocarbon oils may be employed, including organic oils such as vegetable oils which may be understood as any oil extracted from a plant source. Vegetable oils may therefore include soybean oil, canola oil, corn oil, cottonseed oil, etc. which may be added to a given polymer/swelling fluid composition to increase the relative duration of anti-traction performance to any selected surface. In particular, such ability to control evaporation of a swelling or dissolving fluid may be particularly useful under those circumstances wherein ambient temperature conditions would otherwise lead to relatively rapid evaporation of a fluid such as water and loss of anti-traction performance within about 30 minutes or less, including all values and increments therein.

Returning then to a consideration of the polymers suitable for preparation of an anti-traction material, the polymers herein may include and are not limited to polyamides (aliphatic and/or aromatic containing an amide repeating unit —NHCO—), polymers containing hydroxyl (—OH) functionality as a side-group [e.g., poly(vinyl alcohol)] as well as polymers containing carboxylic acid type (—COOH) functionality [e.g. polyacrylic acid] and polymers that may include a residual amide type functionality (—CONH$_2$) [e.g. polyacrylamides] as well as copolymers of any of such structures. For example, a copolymer such as poly(vinyl-acetate)/poly(vinyl alcohol). In addition to such non-crosslinked polymers, other suitable polymers contemplated herein may include hydrogel type polymers. A hydrogel type polymer may be understood as those polymers that are similarly capable of absorbing a fluid such as water and similarly providing anti-traction performance without complete dissolution due to the presence of requisite levels of intermolecular crosslinking (covalent or ionic type). Crosslinking levels may therefore be regulated in such hydrogels to provide relative degrees of crosslinking between about 1-50%, including all values and increments therein, so that suitable anti-traction performance may be achieved.

It may also be appreciated that any one of the previously identified polymers may be in ionic form, such as anionic form, and may therefore contain a residual negative charge due to the presence of a negatively charged ion. Accordingly, suitable polymers for use herein include SUPERFLOC A-120, SUPERFLOC A-130, and SUPERFLOC A-150 HMW, all of which are anionic polyacrylamide flocculants from Cytec Industries. Another example is MAGNAFLOC 1011, a relatively high molecular weight anionic polyacrylamide flocculant from Ciba Specialty Chemicals.

The anti-traction material herein may therefore be formed when the aforementioned polymers, selected by their chemical composition and/or physical features, are combined with a selected fluid. With respect to the relative quantities of polymer and fluid, the fluid may be preferably added to the polymer en route to a targeted surface such that the fluid is present at a level that is about 1 part fluid to 1 part polymer (by weight) to 40 parts fluid to 1 part polymer, including all values and increments therein. One particular preferred range of fluid to polymer may be about 7-9 parts fluid to one part polymer. It may therefore be appreciated that the level of fluid that may be combined with polymer may be influenced by the fluid's ability to swell or dissolve a given polymer, which as noted above may be influenced by such features as polymer particle size, rate of uptake of fluid, polymer absorption capacity, polymer particle porosity, and/or surface area. Furthermore, it may be also appreciated that the amount of fluid that may be required may be influenced by the ambient temperature and/or temperature of the surface for which anti-traction performance is desired as well as the porosity of the surface with respect to the fluid.

The mixture of polymer and fluid herein may also include other components which may be added either to the polymer and/or fluid, or even to both ingredients. For example, malodorants, other noxious chemicals, colorants (to camouflage the material), evaporation-reducing aids, etc. Such additional components may therefore be added in amounts that are effective and at concentrations that may not substantially influence the anti-traction performance of any particular fluid/polymer combination. However, slight reductions in anti-traction performance may be tolerated in certain applications. It is contemplated herein that for 1 part polymer (by weight) the additional components herein may be present at a level of 0.01-0.20 parts by weight or less, including all values and increments therein.

The polymer material herein, whether in particle form or otherwise, may also specifically include a hydrophobic material, which hydrophobic material may include an inorganic type particulate material (i.e. non-carbon based compounds). The term hydrophobic may refer to any material which serves to reduce the rate of fluid absorption of the polymer particles, but not necessarily the ability to ultimately absorb additional amounts of fluid for anti-traction performance. In other words, the addition of hydrophobic material to the polymer material may reduce premature fluid uptake and gellation that might occur during storage without substantially inhibiting desired levels of fluid uptake and/or gellation at a later point in time (e.g., upon release and application to a target surface).

It may therefore be appreciated that such hydrophobic materials may be particularly useful in regulating the rate of fluid absorption under conditions of, e.g. relatively high ambient humidity (e.g. humidity $\geq$50% R.H.) and relatively elevated ambient temperatures (e.g., temperatures $\geq$30° C.) which may be present under certain storage conditions where the anti-tracking materials must be maintained in a ready-to-use condition. However, upon mixing with fluid, gellation resulting in anti-traction performance may still be reliably achieved and, in particular, within less than about 60 seconds as noted above. Accordingly, by incorporating hydrophobic particulate the anti-tracking material herein may be more efficiently stored for longer periods of time (i.e. with an increased "shelf-life").

The hydrophobic particles may be specifically ground or milled to a relatively fine powder and may therefore assume a variety of geometries. The mean particle size of the hydrophobic particles (i.e. the average of the largest linear dimension of a plurality of particles) may be relatively small as compared to that of the polymer particles, relatively larger, or about the same value. Accordingly, the mean particle size of the relatively insoluble or relatively non-swelling hydrophobic particles ($\overline{PS}_{hydrophobic\ particles}$) may be less than or equal to the mean particle size of the polymers suitable for absorption or dissolution by fluid ($\overline{PS}_{polymer}$), i.e., $\overline{PS}_{hydrophobic\ particles} \leq \overline{PS}_{polymer}$. It may therefore be appreciated that such a relationship in mean particle size may provide that the relatively smaller and/or relatively insoluble and/or relatively non-swelling hydrophobic particles may coat the relatively larger hydrophilic particles to control against the rate and/or amount of initial fluid uptake and the "clumping" or particle association that may occur when the polymer particles are stored for extended periods of time. In addition, for 100 parts of polymer material by weight, the amount of hydrophobic material may be present in an amount of up to about 20 parts by weight. Accordingly, the amount of hydrophobic material may be present at an amount of between about 0.01-20.0 parts by weight, including all values and increments therein. In certain embodiments, the amount of hydrophobic material may therefore be about 0.5-1.5 parts by weight for 100 parts of polymer.

In addition, as alluded to above, the mean particle size of the hydrophobic particles may also be greater than or equal to the mean particle size of the polymer, i.e., $\overline{PS}_{hydrophobic\ particles} \geq \overline{PS}_{polymer}$. In this manner it may be appreciated that the hydrophobic particles may create what may be considered to be bridges between the relatively smaller polymer particles. In this manner, the hydrophobic particles may serve as a bearing to permit relative motion between an object in contact with the anti-traction material and the anti-traction material.

As noted above, the hydrophobic material may include an inorganic particulate. For example, a fumed metal oxide may provide the features of an inorganic particulate. Fumed metal oxides may also be treated to impart the characteristic of hydrophobicity. Specifically, fumed silicon dioxide ($SiO_2$), also known as fumed silica, may be treated to remove surface hydroxyl groups and, therefore, the majority of hydrogen bonding sites. In the absence of hydrogen bonding sites, the fumed silica may also avoid significant formation of hydrogen bonds with fluids such as water. Instead, the fumed silica may become hydrophobic. Examples of commercially available hydrophobic fumed silica include but are not limited to CAB-O-SIL from Cabot Corporation and AEROSIL from Degussa Corporation. Other exemplary inorganic oxides contemplated herein include titanium and aluminum oxides, e.g. $TiO_2$ and $Al_2O_3$. In addition, it should be noted herein that while not necessarily as efficient as, e.g., fumed silica, one may employ calcium sulfate or hydrophilic fumed silica to also improve shelf life.

Expanding upon the above, the use of hydrophobic particles may therefore serve to regulate the fluid (e.g. water) permeability of hydrophilic polymer particles and, therefore, may improve storage performance. That is, the combination of hydrophilic polymer and hydrophobic material (e.g., inorganic metal oxide particulate) may reduce premature absorption of fluid during storage and even premature absorption of fluid that may occur in the course of dispensing (e.g., during "powder feeding" of the hydrophilic polymer to a given location for mixing with fluid). In addition, the hydrophobic inorganic particles may serve as an anti-settling agent and thus may enhance the storage properties of the hydrophilic polymer particles with respect to powder leveling. Further, the hydrophobic inorganic particles may also function as what may be understood as a free flow agent and thus may optimize flow behavior of the hydrophilic polymer particles upon dispensing and mixing with a given fluid.

By way of example, a selected hydrophilic polymer particles suitable for formation of an anti-traction material may have a relatively high affinity for water and thus may be susceptible to premature absorption if exposed to incidental environmental moisture during storage and dispensing. For example, when allowed to lie dormant prior to use, the polymer particles may absorb water from humid air (e.g., ≧50% R.H) thereby causing association of the polymer particles and an increase in bulk density. Bulk density may be understood as the weight per unit volume of material. Accordingly, bulk density provides a relative measure of particle size and dispersion which may affect material flow consistency and reflect packaging quantity of any given anti-traction material system. Accordingly, the incorporation of hydrophobic material herein may be understood herein as a method to maintain a relatively more constant value of bulk density during storage of any of the anti-tracking precursor polymer materials as compared to those anti-traction systems that do not contain such hydrophobic material. This may also be understood as reducing or preventing "blocking" or polymer particle association.

Another exemplary hydrophobic flow aid contemplated herein is an organic material. An example of this type of hydrophobic flow aid is DryFlo® starch from National Starch and Chemical Company. This material may coat the anti-traction polymer particle similar to what was described above in the case of hydrophobic material selected from inorganic particulate, and may also repel water uptake and/or reduce agglomeration of the anti-traction hydrophilic polymer particles. It may therefore be appreciated that upon application, the DryFlo® starch particles tend not to dissolve in the fluid due to surface tension and/or density considerations and may therefore tend to float on the top of the fluid. This may then provide a slippery surface that may be relatively more slippery that the anti-traction system herein that does not contain such flow aid.

In addition, it has been determined that the polymer particles herein suitable for use in the anti-traction material may be advantageously exposed to an elevated temperature and/or reduced pressure for a given period of time, prior to storage and use as an anti-traction material. In addition, with respect to the use of elevated temperature, one may also do so under conditions where the particles are ventilated (e.g. the use of non-recirculating air). By such procedure it may be appreciated the polymer particles may be conditioned to reduce some initial moisture content. This may then serve to enhance the storage performance and flow behavior of the polymer particles described above. Suitable temperature treatment may therefore include exposing the polymer particles to temperatures of greater than or equal to about 35° C. for a period of time sufficient to reduce water levels to less than or equal to about 5.0% (wt.) prior to storage of the polymer particles for use in an anti-traction application. In addition, the water levels may be conditioned to fall within any range between about 0.01-5.0% (wt.) including all values and increments therein.

It may also be appreciated that with respect to those polymer particles that may indicate a glass transition temperature (Tg), exposure to heating as noted above may increase the observed value of Tg. The increase in Tg value may fall in the range of about 5-25° C. depending upon the time and temperature level selected. Such increase in Tg values may, as in the case of the hydrophobic materials, independently serve to reduce the rate of fluid absorption of the polymer particles but not the ability of the polymer particles to provide anti-traction performance. Specifically, an increase in the value of Tg may elevate the temperature at which the polymer particles may otherwise partially soften. For example, for a polyacrylamide particle the Tg values herein may be observed to fall within a temperature of about 60-90° C. including all values and increments therein. The Tg values herein may be understood as the midpoint in the change in heat capacity vs. temperature curve provided by differential scanning calorimetry at a heating rage of about 10° C./minute. Therefore, it may be appreciated that the polymer particles contemplated herein for use as an anti-traction material may be those polymer particles that provide a Tg value of about 50-100° C., including all values and increment therein, wherein such Tg values may be developed by heat treatment or itself be a characteristic of the polymer particles selected for use as an anti-traction material.

Accordingly, the polymer particles herein having such Tg characteristics or a reduced residual moisture level may have improved flow characteristics, particularly at elevated temperature. For example, by heating, the polyacrylamide particles herein have been observed to flow (without significant blocking) to temperatures of up to an including about 50° C. Therefore it can be appreciated that the flow behavior of the polymer particles herein may be influenced by either incorporation of the hydrophobic flow aids, either alone or in combination with conditioning the polymer particles (e.g., heating, use of reduced pressure, heating with reduced pressure, heating with ventilation) or selecting polymer particles having the relatively higher Tg values noted herein.

Moreover, it may now be appreciated that with respect to milling the polymer particles, described earlier, milling to provide the desired average particle size of about 0.01-2.50 mm may be achieved by first heating relatively larger polymer particles followed by the addition of the hydrophobic material. In addition, one may heat relatively larger polymer particles, incorporate the hydrophobic material, and then mill to a desired average particle size.

The anti-traction material may be applied to a target surface by several means, e.g., the components may be pumped, sprayed, poured, or even air-dropped on the target surface. In one exemplary embodiment, the anti-traction material may be applied to a target surface by combining the hydrophilic polymer particle with the fluid at the time of application to a targeted surface. For example, a mixing nozzle may allow two separate material streams (i.e., polymer and fluid) to be mixed together at the exit point of the nozzle. As another example, the polymer and fluid may be combined after dispensing while en route to the target surface.

The polymer and fluid may also be applied to a target surface as two distinct materials. For example, water (as the fluid) may first be applied to a target surface and polymer may then be applied to the already wet surface. Furthermore, under this procedure, additional polymer may be applied depending upon the desired level of anti-traction performance that may be desired. As another example, the anti-traction material (i.e., polymer and fluid) may be allowed to dry on the target surface, thereby leaving a film. In this embodiment, additional fluid may be applied to the target surface to restore the anti-traction performance.

The anti-traction material may be applied to a target surface in a variety of thicknesses. The thickness may depend upon factors such as the surface temperature and porosity. For example, for the anti-traction material as applied to asphalt, a thickness of greater than or equal to about 0.030 inches (0.762 mm) may be applied. For the anti-traction material as applied on tile, a thickness of greater than or about 0.009 inches (0.229 mm) may be utilized. Accordingly, it may be appreciated that in general, the thickness of the anti-traction material herein is contemplated to be greater than or equal to about 0.005 inches (0.127 mm). The anti-traction material may therefore have a value of greater than or equal to about 0.005 inches (0.127 mm) up to and including about 0.250 inches (6.35 mm), including all values and increments therein. It may therefore be appreciated that thicker quantities may still provide acceptable anti-traction performance, but the cost of the materials may become less desirable.

Further, the duration of anti-traction performance may depend on factors such thickness, humidity, surface temperature, porosity, and water permeability. In various exemplary embodiments on porous concrete surfaces, the duration for which the coating retains its anti-traction properties and characteristics may range from about 30 minutes at about 100° F. to about four hours at about 80° F., where all durations are measured from the time of initial application.

It should therefore be appreciated that the anti-traction material may be applied to both hard and soft surfaces. Some exemplary materials to which the anti-traction material may be applied include concrete, asphalt, tile, wood, grass, or soil. When the anti-traction material is applied to a hard surface such as concrete, asphalt, or compacted soil, treads on footwear or tires may not be effective in penetrating the anti-traction material to gain traction. When the anti-traction material is applied to a soft surface, however, some treads such as cleated shoes or steel studded tires may be able to penetrate the anti-traction material to gain traction. Even then, however, the anti-traction material may remain an obstacle to movement in any direction and significantly impede progress.

The anti-traction material may be equally effective on horizontal, vertical, or sloping surfaces. Some exemplary surfaces to which it may be applied include roads, walkways, runways, floors, walls, steps, stairways, railings, entryways, windows, or doorknobs. The anti-traction material may also be applied to a variety of hand-operated devices to interfere with persons attempting to utilize such devices. For example, devices may include one or a plurality of weapons, tools, or steering columns.

As noted above, the anti-traction material may be dispensed on a target surface to form a coating over which people and vehicles may have difficulty maneuvering. In one exemplary embodiment, the coating may be positioned in or around an area to which one desires to restrict access. Should a person attempt to "slide over" the coating to reach the restricted area, some of the coating may transfer from the surface and onto the propelled person. Thus, even if the propelled person were able to breach the barrier, that person may then find it difficult to maneuver and grasp objects as s/he may also be coated with the anti-traction material. Should a person attempt to build a "bridge" over the coating to reach the restricted area, the bridge materials (boards, other persons) may slide out of position as the person exerts force during crossing. In one exemplary embodiment, the coating may be distributed in a random pattern over a surface, thereby creating both slippery and non-slippery surfaces. Such a random dispersement may impair attempts to run and slide over the coating and/or may make persons attempting to cross the coated surface unsure of their steps.

The anti-traction material may not be easily removed when wet. To remove the ant-traction material, hot or cold high pressure water may be directed at the coating to displace the anti-traction material from the target surface to peripheral sites. Upon drying, the anti-traction material may become a film which may then be removed. This film may also be reconstituted to its original anti-traction state by reapplication of fluid.

The foregoing description is provided to illustrate and explain the present invention. However, the description hereinabove should not be considered to limit the scope of the invention set forth in the claims appended hereto.

What is claimed is:

1. An anti-traction material comprising:
polymer particles capable of absorbing or being dissolved by a first fluid and having an average particle size in the range of about 0.01-2.50 mm where said fluid is present at a ratio of about 1-40 parts by weight of said fluid to one part by weight of said polymer particles wherein said polymer particles and fluid combine to form an anti-traction material; and
wherein said polymer particles are selected from the group consisting of aliphatic polyamides, aromatic polyamides, polymers containing hydroxyl (—OH) functionality, polymers including carboxylic acid functionality (—COOH), polymers containing amide functionality (—NHCO—), polymers containing residual amide functionality (—CONH$_2$) and copolymers and blends thereof.

2. The anti-traction material of claim 1 wherein said average particle size is in the range of about 0.30-0.50 mm and said fluid is present at a level of about 1-20 parts by weight.

3. The anti-traction material of claim 1 wherein a portion of said fluid is absorbed by or dissolves a portion of said polymer particles within less than or equal to about 60 seconds.

4. The anti-traction material of claim 1 wherein said polymer particles have a fluid absorption capacity in the range of about 15-10,000% by weight.

5. The anti-traction material of claim 1 wherein said polymer particles have a mean pore size in the range of about 50-500 μm.

6. The anti-traction material of claim 1 wherein said polymer particles have a mean surface area of greater than or equal to about 0.003 mm$^2$.

7. The anti-traction material of claim 1 wherein said polymer particles have a glass transition temperature of about 50-100° C.

8. The anti-traction material of claim 1 wherein said fluid has a molecular weight of less than or equal to about 1000.

9. The anti-traction material of claim 1 wherein said polymer particles when dissolved by said fluid exhibits a non-Newtonian viscosity value (η') which varies with respect to shear rate.

10. The anti-traction material of claim 1 wherein said fluid is selected from the group consisting of water, alcohols, polyhydric alcohols, organic solvents miscible with water and mixtures thereof.

11. The anti-traction material of claim 1 wherein said first fluid has a specific gravity and including a second fluid which has a specific gravity that is less than the specific gravity of said first fluid.

12. A composition capable of forming an anti-traction material upon exposure to a fluid comprising:
   polymer particles capable of absorbing or being dissolved by a first fluid wherein said polymer particles have an average particle size in the range of about 0.01-2.50 mm;
   hydrophobic particles wherein said hydrophobic particles are present in said composition at about 0.01-20% by weight wherein said hydrophobic particles are capable of controlling the rate and/or amount of fluid absorption of said polymer particles; and
   wherein said polymer particles are selected from the group consisting of aliphatic polyamides, aromatic polyamides, polymers containing hydroxyl (—OH) functionality, polymers including carboxylic acid functionality (—COOH), polymers containing amide functionality (—NHCO—), polymers containing residual amide functionality (—CONH$_2$) and copolymers and blends thereof.

13. The composition of claim 12 wherein said polymer has a mean particle size ($\overline{PS}_{polymer}$) and said hydrophobic particles have a mean particle size ($\overline{PS}_{hydrophobic\,particles}$) wherein $\overline{PS}_{hydrophobic\,particles} \leq \overline{PS}_{polymer}$.

14. The composition of claim 12 wherein said polymer has a mean particle size ($\overline{PS}_{polymer}$) and said hydrophobic particles have a mean particle size ($\overline{PS}_{hydrophobic\,particles}$) wherein $\overline{PS}_{hydrophobic\,particles} \geq \overline{PS}_{polymer}$.

15. The composition of claim 12 wherein said polymer particles have a fluid absorption capacity in the range of about 15-10,000% by weight.

16. The composition of claim 12 wherein said polymer particles have a mean pore size in the range of about 50-500 μm.

17. The composition of claim 12 wherein said polymer particles have a mean surface area of greater than or equal to about 0.003 mm$^2$.

18. The composition of claim 12 wherein said hydrophobic particle comprises an inorganic compound.

19. The composition of claim 12 wherein said hydrophobic particle comprises an organic compound.

20. The anti-traction material of claim 12 wherein said polymer particles when dissolved by said fluid exhibit a non-Newtonian viscosity value (η') which varies with respect to an applied shear rate.

21. The anti-traction material of claim 12 including a second fluid which has a specific gravity that is less than the specific gravity of said first fluid.

22. The anti-traction material of claim 12 wherein said polymer particles have a glass transition temperature of about 50-100° C.

23. A method for forming an anti-traction coating on a selected surface comprising:
   mixing polymer particles having an average particle size in the range of about 0.01-2.50 mm with a first fluid wherein said particles are capable of being absorbed or dissolved by said fluid and wherein said fluid is present at a ratio of about 1-40 parts by weight to one part by weight of said polymer particles and forming said anti-traction coating; and
   wherein said polymer particles are selected from the group consisting of aliphatic polyamides, aromatic polyamides, polymers containing hydroxyl (—OH) functionality, polymers including carboxylic acid functionality (—COOH), polymers containing amide functionality (—NHCO—), polymers containing residual amide functionality (—CONH$_2$) and copolymers and blends thereof.

24. The method of claim 23 wherein said polymer particles are, prior to mixing with said first fluid, exposed to a temperature or pressure to provide polymer particles with a water content of less than or equal to about 5.0% (wt.).

25. The method of claim 23 wherein said coating has a thickness of greater than or equal to about 0.127 mm.

* * * * *